May 8, 1923.
W. L. DODGE
CAMERA
Filed Feb. 14, 1920
1,454,045
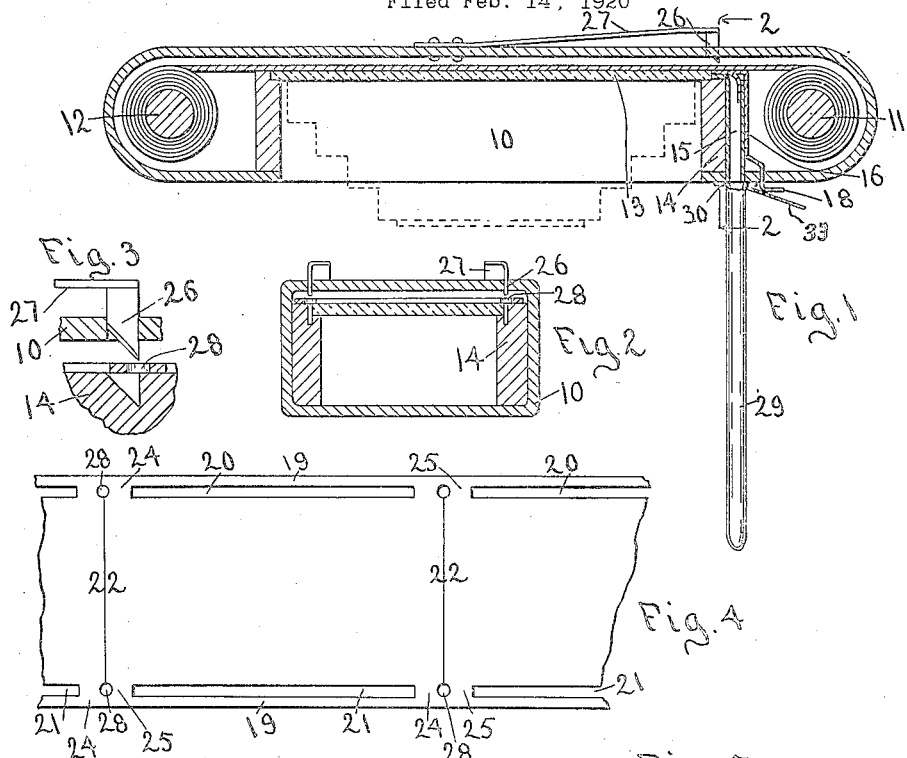
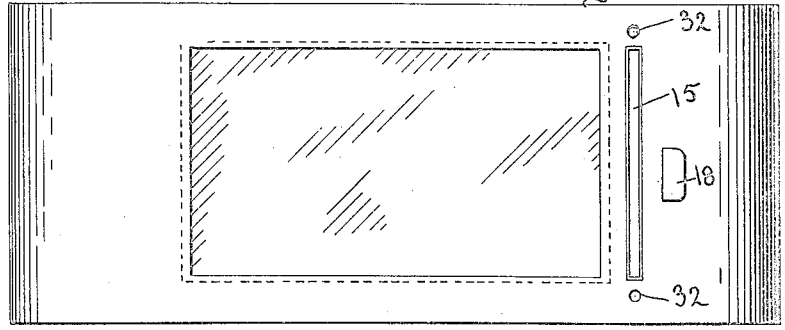
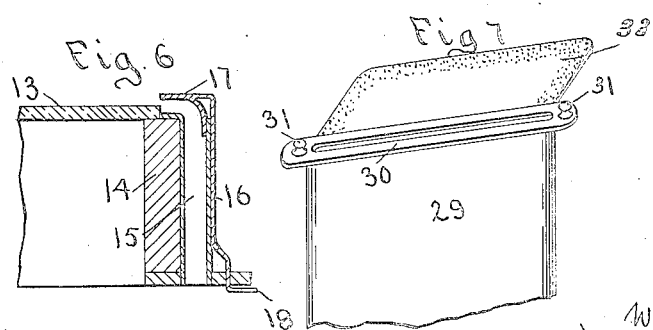
INVENTOR
William L. Dodge Patented May 8, 1923.

1,454,045

UNITED STATES PATENT OFFICE.

WILLIAM L. DODGE, OF DOVER, NEW HAMPSHIRE.

CAMERA.

Application filed February 14, 1920. Serial No. 358,804.

*To all whom it may concern:*

Be it known that I, WILLIAM L. DODGE, a citizen of the United States, residing at Dover, in the county of Strafford, in the State of New Hampshire, have invented a certain new and useful Improvement in Cameras, of which the following is a specification, reference being had to the accompanying drawings.

This invention relates to photographic cameras, my immediate object being to provide reasonably cheap and simple means, which may be readily embodied in cameras otherwise of the ordinary type, whereby exposed portions of strip films may be selectively removed from the strip, in daylight, if desired, without in any degree or manner interfering with the rest of the film; thus rendering it possible, convenient and safe to expose, remove from the camera, and develop any desired section of a strip film without removing the entire strip from the camera and without waiting until the entire strip has been exposed.

With this desirable purpose in mind I have provided the apparatus illustrated in the annexed drawings, in which Figure 1 is a longitudinal sectional view of the major portion of a camera embodying my present invention; Figure 2 is a cross section of the camera on line 2—2 of Figure 1; Figure 3 is a fragmentary sectional view taken on a plane parallel to the section of Figure 1 showing in further detail one of the severing knives and the film in operative relation thereto; Figure 4 shows in plan view a fragment of the film strip; Figure 5 is an front elevation of the camera the lens and bellows being omitted; Figure 6 is a sectional view of the throat opening through which the selected film section passes outward from the camera; and Figure 7 is a perspective view of a portion of an envelope used for removing a severed exposed section of the film.

In Figure 1 the said throat is shown in its normal, or closed, condition while in Figure 6 it is shown opened and ready for the selected film section to leave its normal path and pass outward from the camera.

A camera of the roll film type is designated in the drawing by the numeral 10, and the film is shown passing between the spools 11 and 12 which may be considered as being supported in a rotatable manner in any suitable way in the end parts of the camera. Of these spools, that designated 11 is the take-up spool by which the film is wound up after being exposed, and 12 is the delivery spool. The former is provided with any suitable external means for rotating it, such as are already well known in the art, and the latter may also have an external rotating means for winding the film backward when, or if, occasion arises for so doing. 13 denotes a sheet of glass, or other transparent material, located between the film and lens and serving as a flat field which keeps the film smooth, as the latter is fed along, and said glass also prevents dust from reaching the film and lens. The glass 13 is supported at one end on a post or partition 14 and adjacent to said post is a flat tube 15 upon one wall of which is slidably mounted a plate 16 whose upper end portion is bent laterally, as at 17, and serves normally as a closure for the otherwise open upper end of the tube 15. The lower end portion of the slidable plate 16, as here illustrated, extends through the wall of the camera and terminates in a handle or thumb-piece 18 by means of which the said plate may be raised to open the throat 15, as in Figure 6, or may be lowered to close said throat, as in Figure 1.

Referring now to Figure 4 of the drawings, the numeral 19 denotes as a whole a strip of film adapted for use with cameras of my present improved type, said film, prior to my treatment of it, being substantially like strip films of the kind commonly used in roll film cameras of the general type now in common use. In treating the strip of film so that any desired section of it may be selectively detached and removed from the camera for development, I cut the strip into a plurality of connected sections, each section being of the size of the desired negative; the sides of the partly severed sections being indicated by the open slits 20 and 21, the ends of each section being completely severed from the next adjoining section at the line 22. The side lines 20 and 21, however, do not extend quite to the next section, thus leaving short, uncut portions 24 and 25 whereby the partly severed section remains joined to the film strip sufficiently so that, when the strip is fed in either direction, the several partly severed sections will be carried along with the strip. If desired, the entire strip of film may be used in the ordinary manner, that is to say, without completely severing one or more of the exposed sections and removing it or them from the camera for immediate development but, in the event that certain selected, exposed sections are desired for immediate development, it is only necessary to sever the uncut portions 24 and 25 of the film and then remove the separated section from the camera through the throat 15. In order to thus sever the uncut portions from the strip I may provide knives 26 which are carried by the free end portion of a spring plate 27, which spring plate may be operated from the outside of the camera box. The intersecting angles of the partly severed film sections are, preferably, punched out, or otherwise enlarged, as at 28, to receive the points of the knives and to thus aid, in some degree, in causing the knives to register with the uncut film portions as the knives descend and engage the film.

The operation of my described camera is as follows: Up to the time when it is desired to select, and remove from the camera, an exposed section of the strip film, the manipulation of the camera is essentially the same as in ordinary roll film cameras, that is to say, the feeding of the strip of film, the focusing and the exposure are the same as heretofore. Assuming now that it is desired to remove the last exposed film section, the knives are first forced inward to cut through the portions 24 and to thus completely separate that end of the selected section from the strip.

The film is then fed forward by properly rotating the roll 11, until the uncut portions 25 at the other end of the selected section are directly under the knives, when said knives are again brought into use to cut through the said portions 25, thus completely severing the selected section from the main strip. Meanwhile (the plate 16 having been slid to the open position seen in Figure 6 of the drawings), as the strip is being fed backward the end of the selected section that was first detached from the strip is directed into the throat 15 and is fed downward through said throat until the major portion of said selected section passes outward from the camera box to a position where it can be grasped and drawn completely away from the camera; the front end of the ejected section having a decided tendency to curl downward and thus enter the throat because of the fact that the strip of film will have been coiled for some time previous around the delivery roll 12. If the operation, just described, of removing the selected section, is carried on in a dark room no special care need be taken to prevent rays of actinic light from entering the camera through the throat 15. If, however, the said operation is carried on in open daylight, a suitable receiver may be provided into which the ejected film will pass as it leaves the throat as, for example, an envolope 29 made of opaque material, said envelope having at its open end a plate 30 that may be temporarily fastened to the camera box by some suitable means such as, for example, snaps 31 of the well known "glove fastener" type which may be snapped into sockets 32 in the wall of the camera box. After the film section has been passed into the envelope the slide 16 is drawn downward so as to close the inner end of throat 15 against the entrance of light; the envelope is then pinched together just below the plate 30 while the envelope is being detached from the camera and the gummed flap 33 of the envelope is being folded over the otherwise open end of the envelope and stuck down. The envelope and the enclosed exposed film section may then be taken to some safe place for development of the film.

My described improvements may be embodied, at a reasonable cost, in strip film cameras as now commonly constructed and, by so doing, it becomes easy and practical to remove from the camera any desired section or sections of exposed film for immediate development without disturbing the remainder of the strip of film.

Having thus described my invention, I claim:—

1. A camera of the roll film type having a passage extending from the path in which the film is adapted to travel to the exterior of the camera, means for severing sections of a film in the camera, and a gate adapted to open and close the interior entrance to said passage whereby, when opened, to permit travel of such severed film section into the passage.

2. A camera having means for mounting and propelling a rolled film strip, cutting means mounted upon the camera arranged and constructed to sever from such strip sections or panels of the film having less width than the strip, a passage branching from the path in which the strip is propelled and leading to the exterior of the camera, and a gate normally covering the entrance to said passage and adapted to be opened to permit entrance thereinto of such severed film section.

3. A roll film camera having means for supporting and propelling a film strip and including a passage branching from the path in which said strip is adapted to travel to the exterior of the camera, cutters located adjacent to but within the opposite bounds of the path in which such strip travels and adapted to sever successively different portions of a panel included within the edges of the strip, and a gate normally covering the entrance to said passage but adapted to be opened to permit entrance of the forward edge of a partially severed film panel under propulsion of the forward progress of the strip.

4. A camera as set forth in claim 3 in combination with an envelope adapted to be mounted in register with the outlet orifice of said passage for receiving the film panel ejected therethrough.

5. The combination of a camera and an envelope adapted to receive a section or panel from a roll film, said camera having means for mounting and propelling a film strip in a given path, means for severing different parts of a section or panel from within the edges of such strip, an outlet passage for conducting such severed section, means for opening and closing the entrance to said passage, and means for positioning said envelope in register with the outlet from said passage.

6. A camera of the roll film type and in combination therewith spools arranged for holding a film strip in position to receive light impressions, and for propelling said strip, such strip having panels within its edges initially partly severed therefrom and in connection with the side parts of the strip at the opposite sides of each of their ends, cutters mounted upon the camera over the paths in which the unsevered parts of the film strip travel, external means for impressing said cutters into the film strip, whereby to sever said portions, a passageway in the camera branching from the feeding path of the film strip, and a gate operable from the exterior of the camera for respectively opening and closing the entrance to said passage.

7. A camera comprising a casing having an interior light excluding chamber and extensions for holding film spools, spools rotatably mounted in said extensions, and a film strip rolled upon said spools, said strip having transverse cuts terminating within the opposite edges thereof and partially severing panels of the film, knives arranged over parts of the film inside of its edges, an external means for so operating said knives as to complete the severance of such panels along lines within the film edges, a passageway leading through one of said extensions outside of the light excluding chamber to the exterior of the casing and having its entrance close to the path of the strip, a gate normally covering the inner end of said passageway, and external means for opening and closing said gate, the gate when opened being moved across the normal path of the film whereby it is enabled to intercept the advancing end of a partially severed panel and deflect such panel into the passageway.

8. A camera having means for mounting and propelling a film strip, a passageway leading from the path of travel of such strip to the outside of said camera beside the location of that part of the strip which is exposed to light when a picture is taken, cutting means on the camera for severing the interior part of the film from the edge portions thereof at points near the entrance to said passageway, a gate adapted to cover the inner end of said passageway and movable thence across the path of the film to deflect the advancing edge of a partially severed section of the film, and external accessible means for so moving said gate.

9. A camera of the roll film type, including means for supporting and propelling a film strip, and knives mounted adjacent to the locations in which the opposite edges of the film travel but within such edges, whereby they are adapted, in combination with the feed of the film, to sever sections from between the edges thereof.

10. A camera of the roll film type, including means for supporting and propelling a strip film, said camera having a passage extending from the location in which the film travels to the outside of the camera for delivering severed sections of the film, and means for severing sections from between the edges of the film.

11. A camera of the roll film type having means for supporting and propelling a strip film, means for severing sections from between the edges of a film so supported, a passage leading from the path in which the film is normally propelled to the outside of the camera and adapted to permit passage of such severed sections, and a gate normally excluding light from said passage.

12. The combination of a casing, means within said casing for supporting and propelling a film strip, and cutting means mounted adjacent to the location in which the opposite edges of such film travel, but within such edges, said cutting means being adapted to sever interior sections of the strip from the edge portions thereof.

13. The combination of a casing, spools adapted to support a film strip rotatably within said casing parallel to one another, the casing having a passageway for such strip between the locations of said spools and having also a delivery passage extending from said passageway to the exterior of the casing for delivering severed sections of the film, and cutting means adapted to sever interior sections from the side portions of the film.

14. The combination of a light-excluding casing having take-up and delivery spools rotatably mounted in parallel in said casing and adapted to support and propel a film strip, means for severing sections from between the edges of a film strip so supported, a passage leading from the path in which the film strip travels from one spool to the other, which passage opens to the exterior of the casing and is adapted to permit discharge of such severed sections, and a gate operable to cover and uncover said passage and to exclude light therefrom when covering it.

WILLIAM L. DODGE.